United States Patent [19]

Antone et al.

[11] Patent Number: 5,361,014

[45] Date of Patent: Nov. 1, 1994

[54] APPARATUS FOR DRIVING A PIEZOELECTRIC ACTUATOR

[75] Inventors: James A. Antone, Peoria, Ill.; Fred C. Lee, Blacksburg, Va.; Wojciech A. Tabisz, Vancouver, Wash.

[73] Assignee: Caterpillar Inc., Peoria, Ill.

[21] Appl. No.: 150,706

[22] Filed: Nov. 10, 1993

[51] Int. Cl.$^5$ .................. H01L 41/08; F02M 51/00
[52] U.S. Cl. .................. 310/316; 310/317; 123/478; 123/498
[58] Field of Search .............. 310/316, 317; 123/478, 123/498, 474

[56] References Cited

U.S. PATENT DOCUMENTS

| | | | |
|---|---|---|---|
| 3,500,799 | 3/1970 | Benson | 123/32 |
| 3,589,345 | 6/1971 | Benson | 123/498 |
| 4,333,434 | 6/1982 | Brunsis et al. | 123/478 |
| 4,469,974 | 9/1984 | Speranza | 310/316 |
| 4,481,554 | 11/1984 | Henricks et al. | 361/152 |
| 4,499,878 | 2/1985 | Igashira et al. | 123/478 |
| 4,520,289 | 5/1985 | Sato et al. | 310/316 |
| 4,535,743 | 8/1985 | Igashira et al. | 123/472 |
| 4,537,353 | 8/1985 | Speranza | 239/102 |
| 4,568,849 | 2/1986 | Sato et al. | 310/316 |
| 4,595,854 | 6/1986 | Yano et al. | 310/317 |
| 4,604,675 | 8/1986 | Pflederer | 361/155 |
| 4,644,212 | 2/1987 | Morituga et al. | 310/317 |
| 4,649,886 | 3/1987 | Igashira et al. | 123/498 |
| 4,658,155 | 4/1987 | Ohba et al. | 307/154 |
| 4,680,667 | 7/1987 | Petrie | 361/154 |
| 4,688,536 | 8/1987 | Nitsuyasu et al. | 123/490 |
| 4,732,129 | 3/1988 | Takigawa et al. | 123/478 |
| 4,767,959 | 8/1988 | Sakakibara et al. | 310/317 |
| 4,841,191 | 6/1989 | Takata et al. | 310/317 |
| 4,845,419 | 7/1989 | Hacker | 320/39 |
| 4,947,074 | 8/1990 | Suzuki | 310/316 |
| 5,013,955 | 5/1991 | Hara et al. | 310/316 |
| 5,095,256 | 3/1992 | Ueyama et al. | 318/116 |
| 5,130,598 | 7/1992 | Verheyen et al. | 310/316 |
| 5,208,505 | 5/1993 | Mitsuyasu | 310/317 |
| 5,214,340 | 5/1993 | Suzuki | 310/316 |

FOREIGN PATENT DOCUMENTS

| | | | |
|---|---|---|---|
| 0324450 | 7/1989 | European Pat. Off. | F02D 41/20 |
| 6022050 | 7/1983 | Japan | F02D 41/40 |
| 59-168379 | 3/1984 | Japan | F02D 41/20 |

OTHER PUBLICATIONS

SAE Technical Paper 800502, "Piezomotors–Electromechanical Muscle", C. G. O'Neill et al., Congress & Expo Cobo Hall, Detroit, Feb. 25–29, 1980.

*Primary Examiner*—Thomas M. Dougherty
*Attorney, Agent, or Firm*—David M. Masterson

[57] ABSTRACT

An apparatus that drives a piezoelectric actuator in response to charging and discharging command signals is disclosed. The apparatus includes an energy source that supplies electrical energy to the piezoelectric actuator. A charging circuit includes: a charging transistor connected to the energy source to control the amount energy supplied to the piezoelectric actuator, a charging inductor connected to the charging transistor to limit the rate of change of energy supplied to the piezoelectric actuator, and a charging thyristor disposed between the charging circuit and the piezoelectric actuator. A selecting circuit receives the charging command signal and responsively biases the charging thyristor ON to connect the piezoelectric actuator to the charging circuit. A comparator determines the magnitude of voltage applied to the piezoelectric actuator. A control circuit receives the charging command signal, and responsively biases the charging transistor alternately ON and OFF to control the amount of energy supplied to the piezoelectric actuator in response to the piezoelectric actuator voltage being less than an upper desired voltage value. Finally, the selecting circuit biases the charging thyristor OFF to disconnect the piezoelectric actuator from the charging circuit in response to the piezoelectric actuator voltage being greater than or equal to the upper desired voltage value.

18 Claims, 7 Drawing Sheets

Fig_3_

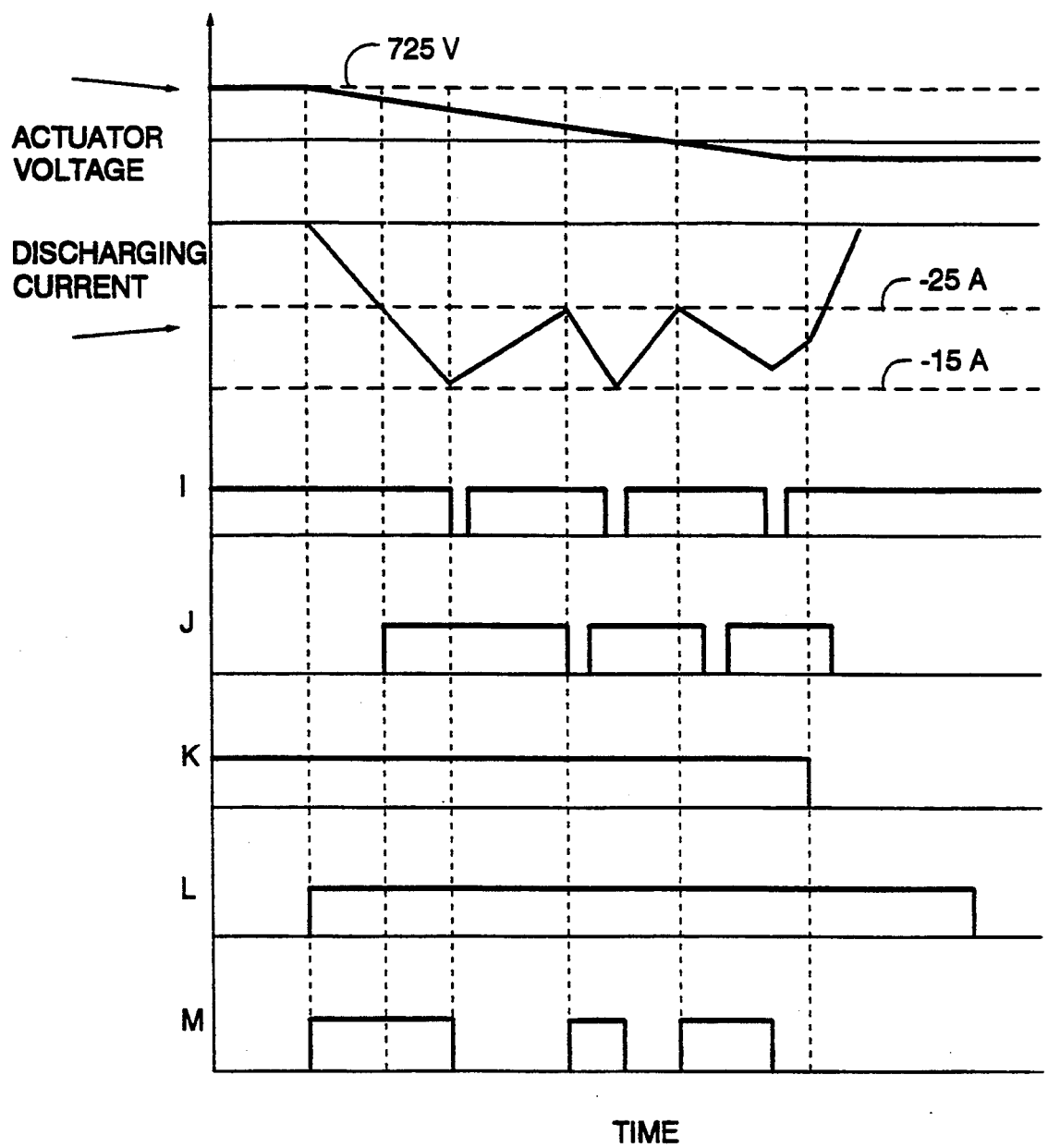
Fig_6_

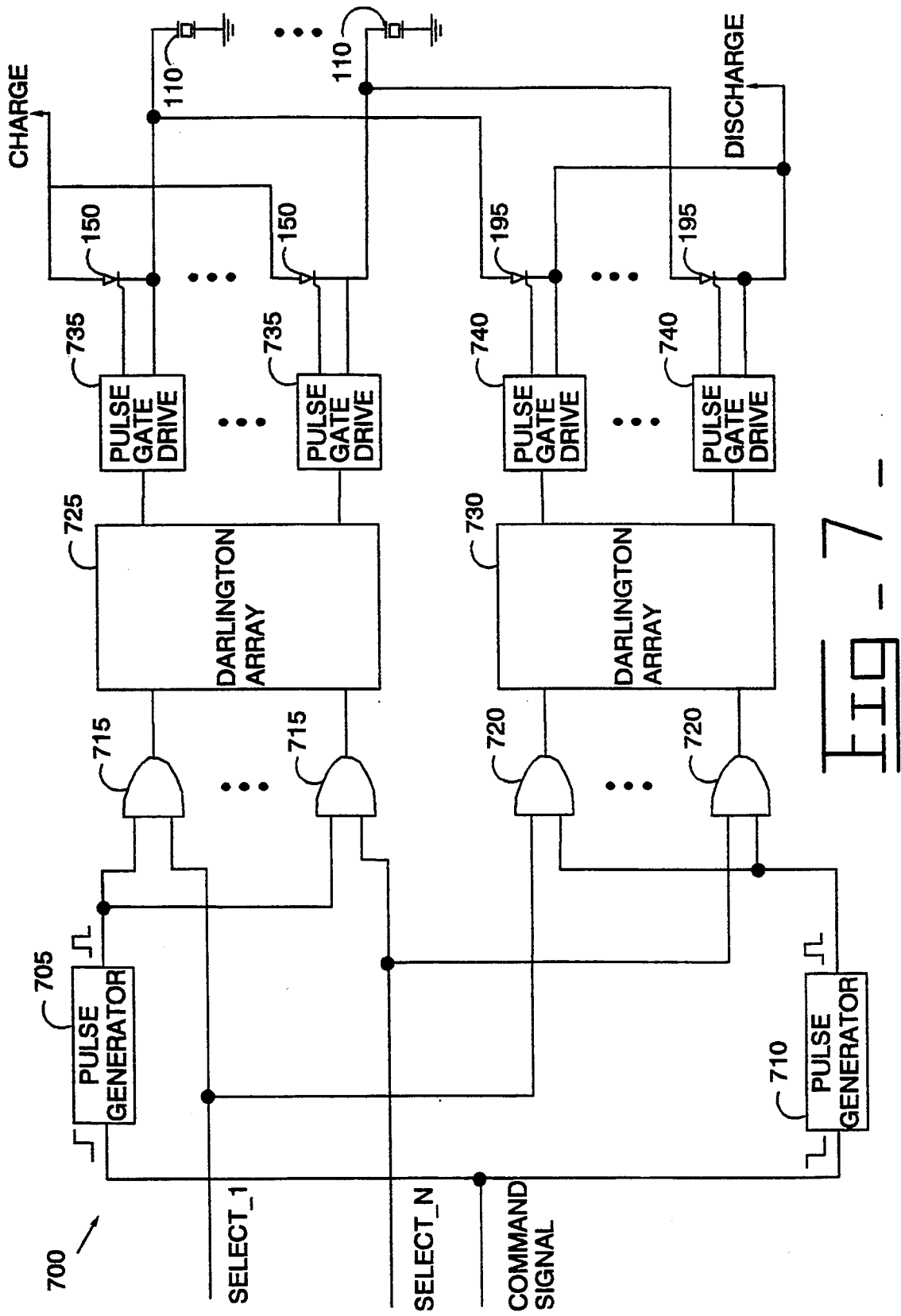

APPARATUS FOR DRIVING A PIEZOELECTRIC ACTUATOR

TECHNICAL FIELD

This invention relates generally to an apparatus for driving a piezoelectric actuator and, more particularly, to an apparatus for driving a piezoelectric actuator that controls a control element of an internal combustion engine.

BACKGROUND ART

The use of a piezoelectric actuator as a means for converting electric power into mechanical power is widely known. For instance, such a piezoelectric actuator may be conveniently used to control a fuel injection valve of an internal combustion engine. This is advantageous, since a piezoelectric actuator has a faster response than a conventional electromagnetic solenoid. Accordingly, control of the fuel injection valve is performed by utilizing the responsive characteristics of the piezoelectric actuator.

It is necessary to provide a drive circuit for controlling the piezoelectric actuator by supplying a voltage to the actuator. Since a piezoelectric actuator requires a relatively high drive voltage, a power source which can supply a sufficiently high voltage is required. When such a high voltage power source is not used, a drive circuit that can boost the drive voltage to the required high level is needed. The later is the conventional approach.

Conventional piezoelectric driver circuits use an LC frequency design. This type of design "matches" an inductor to a capacitor to obtain a voltage doubling effect. However, large inductance and capacitance values are required to double the voltage value. Large inductors and capacitors are undesirable because of the large amount of space that the inductor and capacitor require.

The present invention is directed to overcoming one or more of the problems as set forth above.

DISCLOSURE OF THE INVENTION

In one aspect of the invention, an apparatus that drives a piezoelectric actuator in response to charging and discharging command signals is disclosed. The apparatus includes an energy source that supplies electrical energy to the piezoelectric actuator. A charging circuit includes: a charging transistor connected to the energy source to control the amount energy supplied to the piezoelectric actuator, a charging inductor connected to the charging transistor to limit the rate of change of energy supplied to the piezoelectric actuator, and a charging thyristor disposed between the charging circuit and the piezoelectric actuator. A selecting circuit receives the charging command signal and responsively biases the charging thyristor ON to connect the piezoelectric actuator to the charging circuit. A comparator determines the magnitude of voltage applied to the piezoelectric actuator. A control circuit receives the charging command signal, and responsively biases the charging transistor alternately ON and OFF to control the amount of energy supplied to the piezoelectric actuator in response to the piezoelectric actuator voltage being less than an upper desired voltage value. Finally, the selecting circuit biases the charging thyristor OFF to disconnect the piezoelectric actuator from the charging circuit in response to the piezoelectric actuator voltage being greater than or equal to the upper desired voltage value.

BRIEF DESCRIPTION OF THE DRAWINGS

For a better understanding of the present invention, reference may be made to the accompanying drawings in which:

FIG. 6 shows a timing diagram associated with the discharging control circuit; and FIG. 7 shows an actuator selecting circuit associated with the present invention.

BEST MODE FOR CARRYING OUT THE INVENTION

Figure 1:
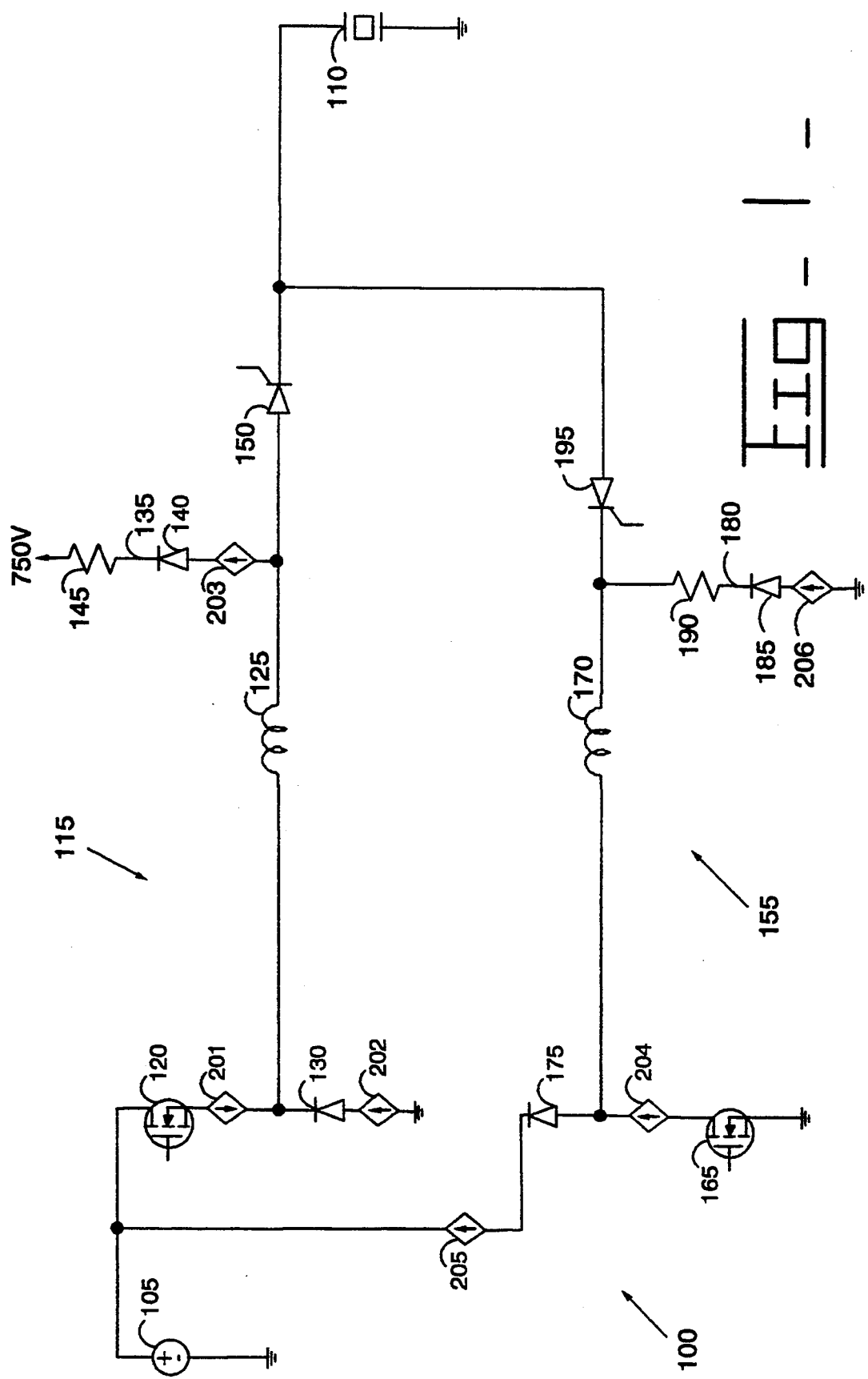
FIG. 1 shows a piezoelectric driving circuit associated with a preferred embodiment of the present invention.

Referring now to the drawings, and especially to FIG. 1, a preferred embodiment of the present apparatus 100 is shown. The present apparatus 100 is designed to drive a plurality of piezoelectric actuators.

For the purposes of this discussion, a piezoelectric actuator is defined as a plurality of pellet type piezoelectric elements laminated in the form of a cylinder. Usually, a type of ceramic is used as the piezoelectric element. This piezoelectric element has an important feature that makes it widely utilized for mechanical-electrical conversion or electrical-mechanical conversion. That is, when an electric field is applied in a longitudinal direction to a piezoelectric element, the thickness of the element is rapidly contracted to the original state. The piezoelectric actuator may be used in, for example, a fuel injection device or engine valve lifting device. The movement of a fuel injection valve can be controlled in response to this expansion and contraction so that the fuel injection timing and quantity also can be controlled by the movement of the piezoelectric actuator.

The apparatus 100 includes an energy source 105 for supplying electrical energy to a piezoelectric actuator 110. The energy source, for example, may provide a voltage of 750 volts. The apparatus 100 further includes a charging circuit 115 that controllably delivers the energy supplied by the energy source 105 to the piezoelectric actuator 110.

The charging circuit 115 includes a charging transistor 120 and a charging inductor 125. The charging transistor 120 controls the amount of energy supplied to the piezoelectric actuator 110 and the charging inductor 125 limits the rate of change of energy supplied to the piezoelectric actuator 110. The charging transistor 120 may include a MOSFET or IGBT type transistor. For example, the charging transistor 120 may be similar to that provided by Toshiba as part number GT25Q101. The charging inductor 125 is of a toridial type construction with a value of 600 micro Henry.

As shown, the drain of the charging transistor 120 is connected to the energy source 105 and the charging transistor source is connected to the charging inductor 125. Additionally a charging diode 130 is provided. The cathode of the charging diode 130 is connected to the charging transistor source, and the anode of charging diode 130 is connected to ground. The combination of the charging transistor 120 and diode 130 provides for hysteretic current control.

The charging circuit 115 further includes a high voltage clamping circuit 135 that clamps the energy supplied to the piezoelectric actuator 115 at a predetermined charging voltage level. The clamping circuit 135 includes a clamping diode 140 and a clamping resistor 145 that clamps the charging energy at slightly above 750 volts, for example.

A charging thyristor 150 is provided to connect the piezoelectric actuator 110 to the charging circuit 115. As shown, the anode of the charging thyristor 150 is connected to the charging circuit 115 and the cathode is connected to the piezoelectric actuator 110.

The apparatus 100 also includes a discharging circuit 155 that controllably discharges the energy from a "charged" piezoelectric actuator 110. The discharging circuit 155 includes a discharging transistor 165 that controls the amount of energy discharged from the piezoelectric actuator 110 and a discharging inductor 170 that limits the rate of charge of energy discharged from the piezoelectric actuator 110. The discharging transistor 165 and inductor 170 have similar characteristics as the charging transistor 120 and inductor 125. As shown, the discharging transistor drain is connected to the discharging inductor 170 and the discharging transistor source is connected to ground.

An anode of a discharging diode 175 is connected to the discharging transistor drain and the cathode of the discharging diode 175 is connected to the energy source 105. A low voltage clamping circuit 180 clamps the discharging energy at slightly below 0 volts. The low voltage clamping circuit 180 includes a clamping diode 185 and a clamping resistor 190. A discharging thyristor 195 is provided to connect the piezoelectric actuator 110 to the discharging circuit. As shown, the anode of the discharging thyristor 195 is connected to the piezoelectric actuator 110 and the cathode of the discharging thyristor 195 is connected to the discharging inductor 170.

The apparatus 100 also includes several current sensing devices 201–206 for detecting current flowing though the various devices of the charging and discharging circuits. In the preferred embodiment the current sensing devices 201–206 include current sense transformers, which are well known in the art.

Figure 2:
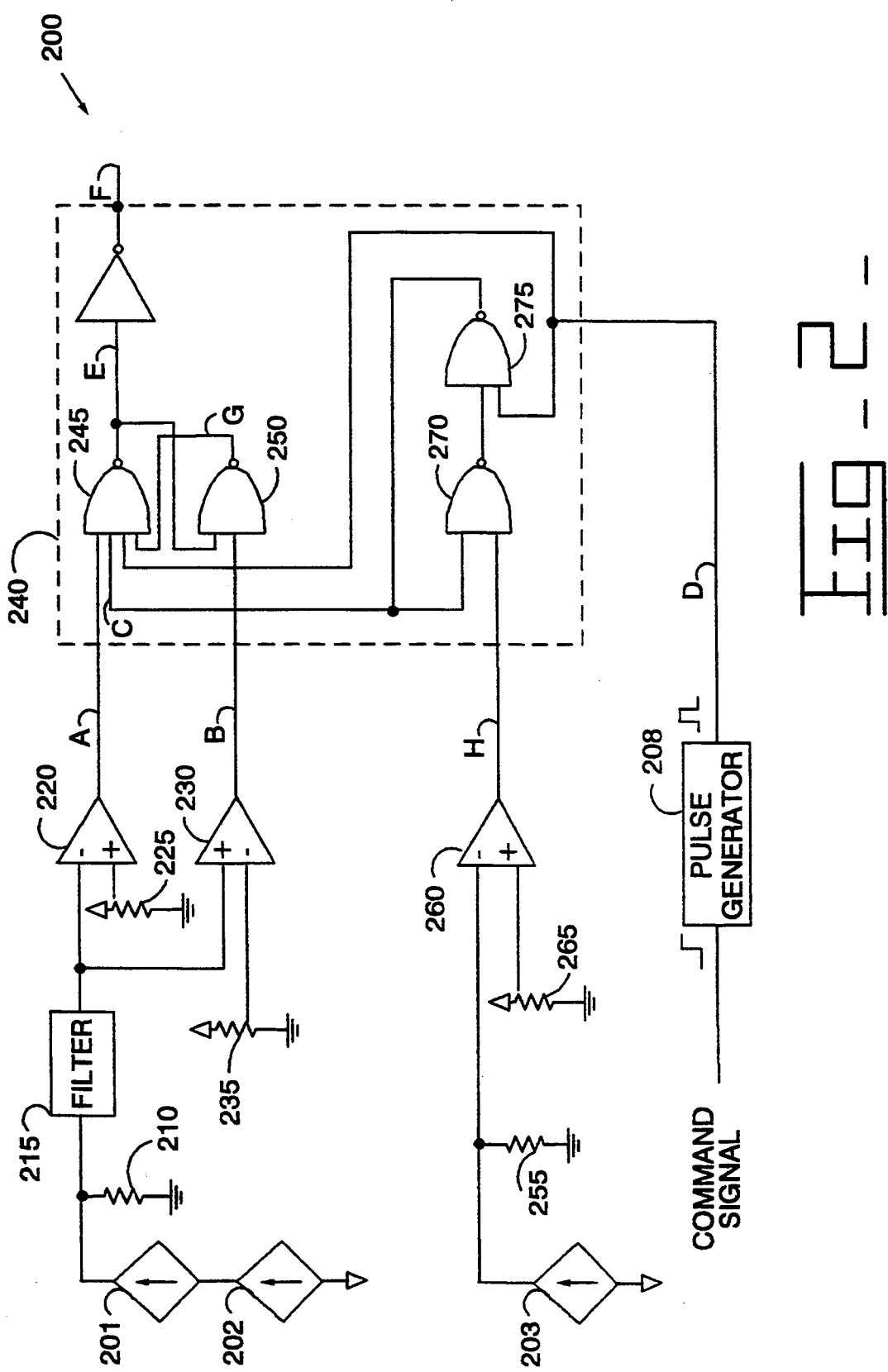
FIG. 2 shows a charging control circuit associated with the present invention.

Referring now to FIG. 2, a charging control circuit 200 controls the operation of the charging transistor 120. The charging of the piezoelectric actuator 110 begins with a "low to high" transition of the command signal—the charging command signal. A pulse generator 208 produces a charging pulse after receiving the charging command signal. The piezoelectric actuator will only charge during the duration of the charging pulse.

The current sensing transformers 201,202 detect the current that is charging the piezoelectric actuator 110 and responsively produce respective current sensing signals. A sensing resistor 210 receives the superposition of the current sensing signals. The voltage across the sensing resistor 210 is filtered via an R/C filter 215, is delivered to an inverting terminal of a first charging comparator 220 and is compared to a predetermined upper magnitude set by potentiometer 225. Additionally, the filtered voltage is delivered to a non-inverting terminal of a second charging comparator 230 and is compared to a lower threshold set by potentiometer 235. The output of the first and second comparators 220,230 are delivered to a charge latching circuit 240. More specifically, the output of the first charging comparator 220 is received by a four-input NAND gate 245 and the output of the second comparator 230 is received by a two-input NAND gate 250.

The current sense transformer 203 detects the current through the high voltage clamping circuit 135 and responsively delivers a current sensing signal to sensing resistor 255. The voltage across the sensing resistors 255 is delivered to a non-inverting input of a third charging comparator 260 and compared to a predetermined voltage value that represents an upper desired voltage of a charged piezoelectric actuator. The predetermined voltage value is set via potentiometer 265. The output of the third comparator 260 is delivered to the charge latching circuit 240. More particularly, the output of the third comparator 260 is delivered to NAND gate 270. The output of NAND gate 270 is connected to NAND gate 275.

Figure 3:
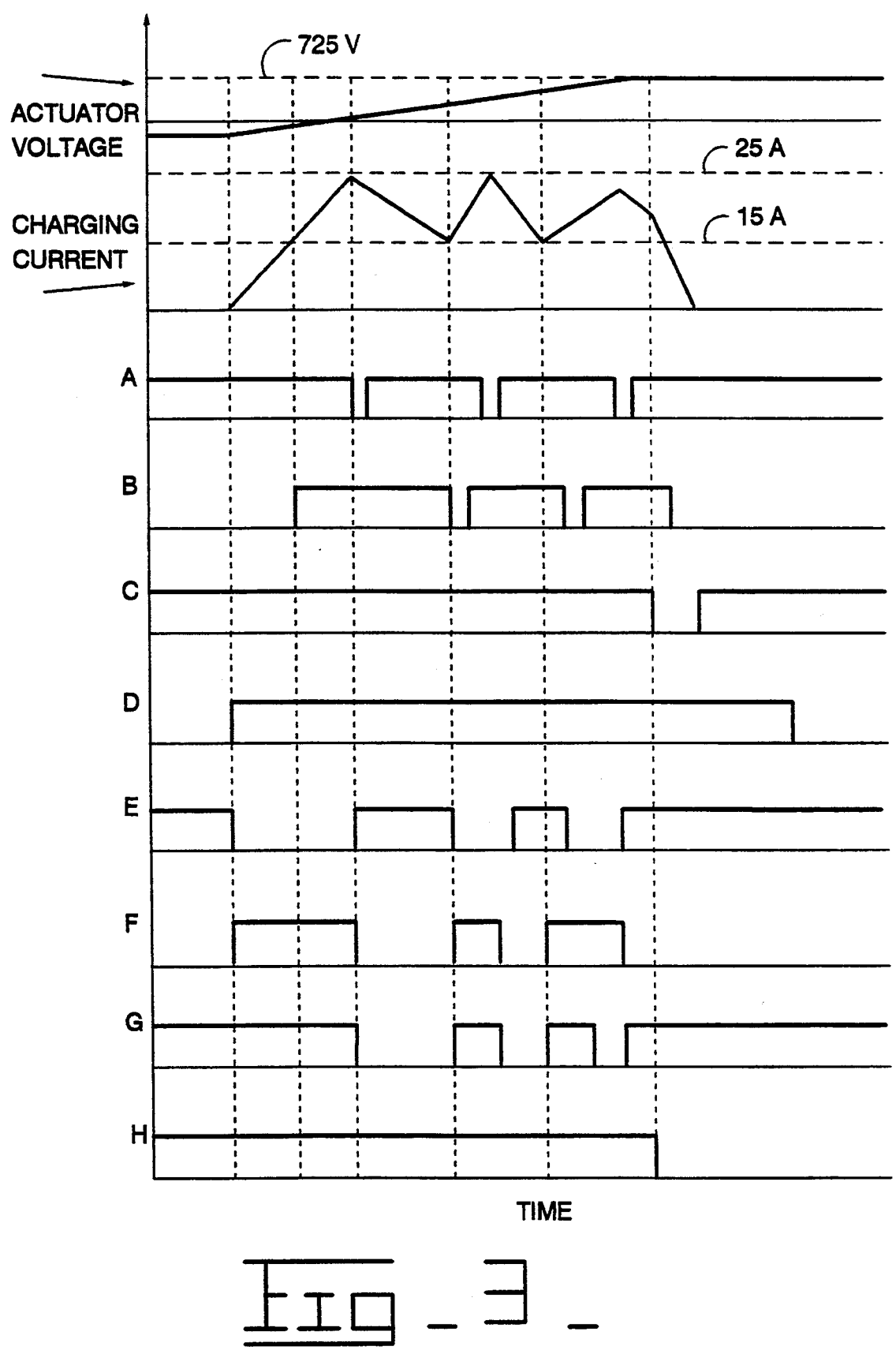
FIG. 3 shows a timing diagram associated with the charging control circuit.

The timing diagram illustrated in FIG. 3 shows the waveforms associated with various points of the charging control circuitry 200.

Figure 4:
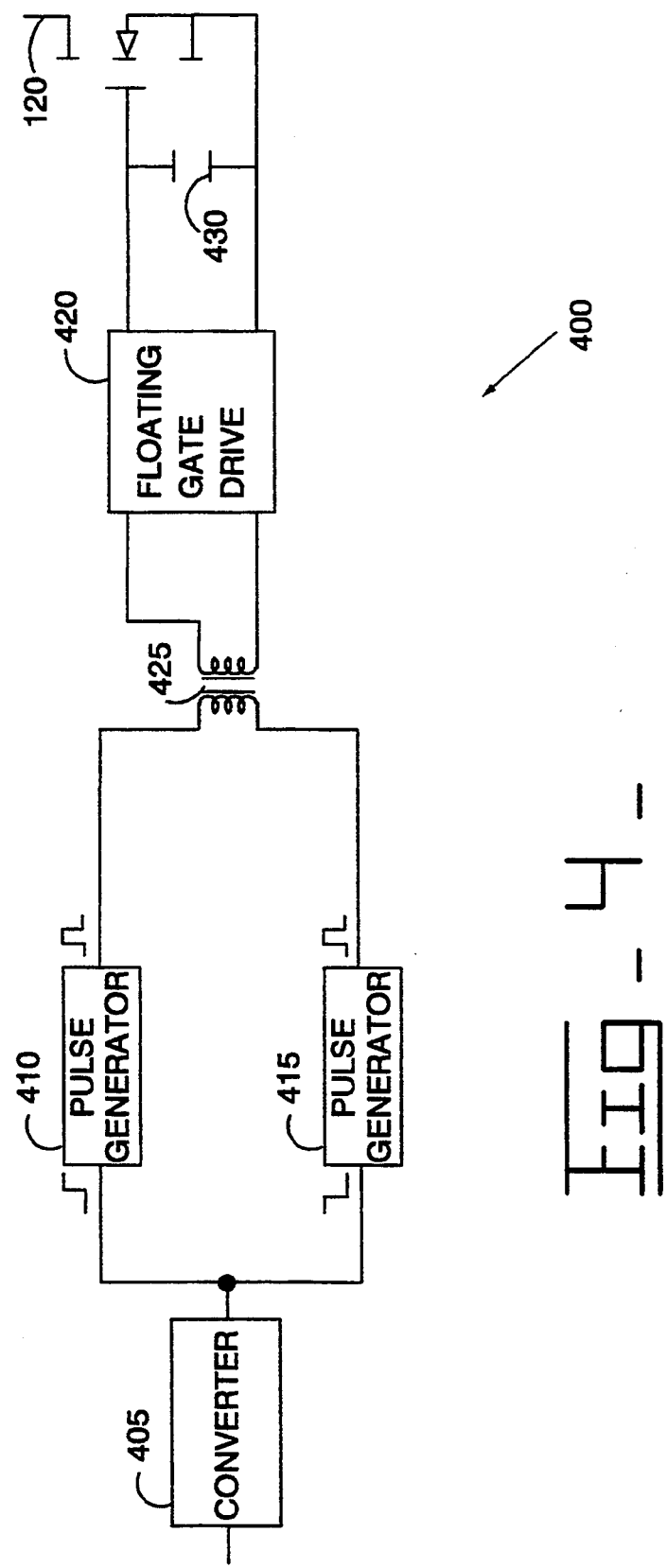
FIG. 4 shows a isolated gate drive circuit associated with the present invention.

The output of the charging control circuit (denoted by point F) is delivered to an isolated gate drive circuitry 400 as illustrated in FIG. 4. The control signal produced by the charging control circuit is scaled from a 5 volt magnitude to a 12 volt magnitude by a converter circuit 405 in a well known manner. Depending upon the polarity of the charging control signal, the signal is converted into a pulse signal via pulse generators 410,415. Since the charging transistor source "floats" between 0 and 750 volts a floating gate drive circuit 420 is required. Accordingly transformer 425 provides electrical isolation between the charging control circuit and the charging circuit 115. For example, a "low to high" transition of the control signal results in pulse generator 410 to produce a pulse that causes the floating gate drive circuit 420 to charge the capacitor 430. Once the capacitor is charged to 10 volts, for example, the charging transistor 120 is biased "ON". Conversely a "high to low" transition of the control signal results in pulse generator 415 to produce a pulse that causes the floating gate drive circuit 420 to discharge the capacitor 430, which causes the charging transistor 120 to be biased "OFF".

The operation of the gate drive circuit 420 is discussed with more particularity in co-pending, commonly owned application (Ser. No. 08/140,934) titled "Gate Drive Circuit," the entire disclosure of which is herein incorporated by reference.

Figure 5:
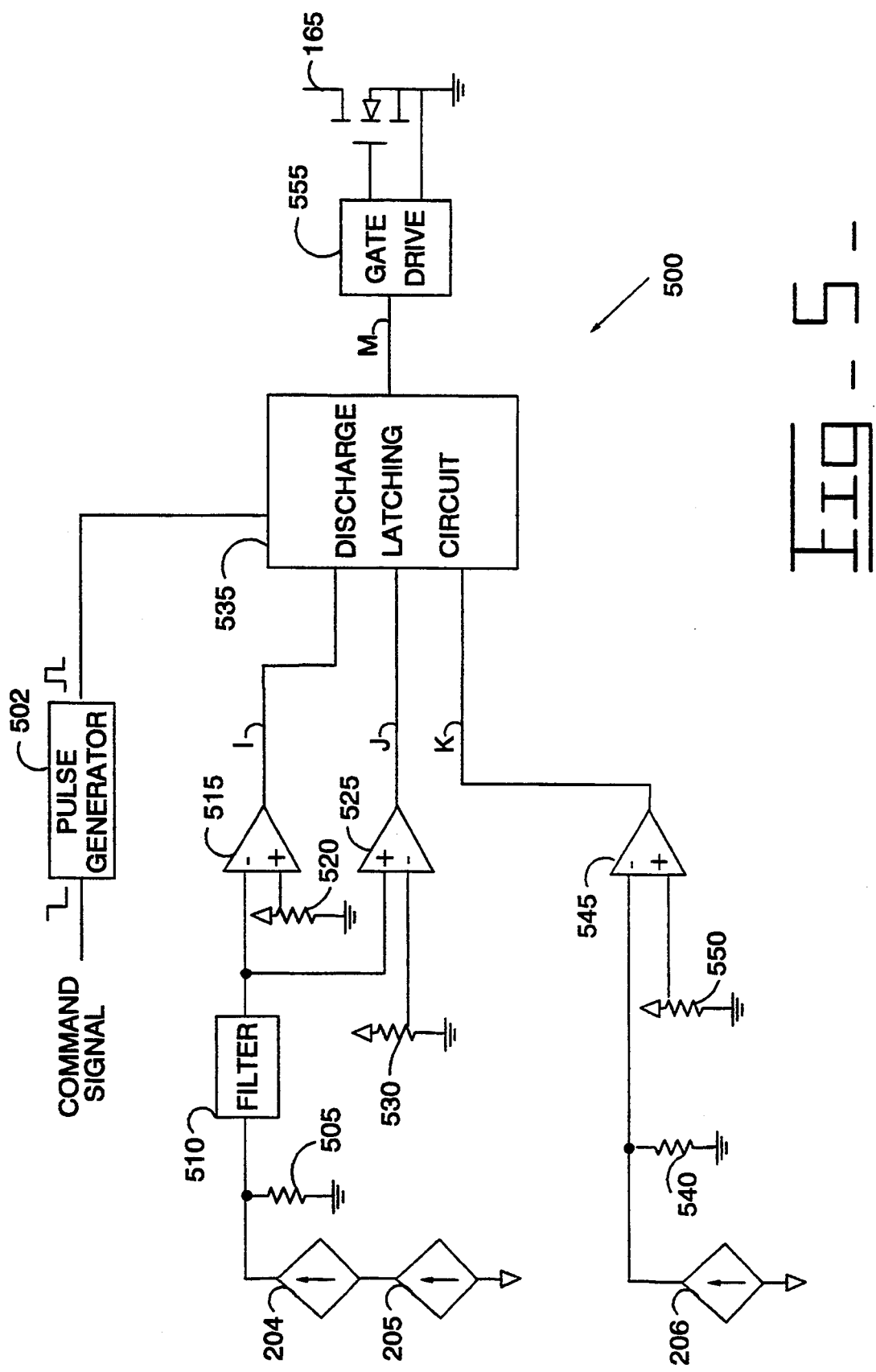
FIG. 5 shows a discharging control circuit associated with the present invention.

Shown in FIG. 5 is the discharging control circuit 500. The discharging control circuit 500 is similar in operation to the charging control circuit. The discharging of the piezoelectric actuator 110 begins with the "high to low" transition of the command signal—the discharging command signal. For example upon receiving the discharging command signal, pulse generator 502 produces a discharging pulse. The discharging of the piezoelectric actuator must occur during the duration of the discharging pulse.

The current sensing transformers 204,205 detect the current that is discharged from the piezoelectric actuator 110 and responsively produce respective current sensing signals. A sensing resistor 505 receives the superposition of the current sensing signals. The voltage across the sensing resistor 505 is filtered via an R/C filter 510, is delivered to an inverting terminal of a first discharging comparator 515 and is compared to a predetermined upper magnitude set by potentiometer 520. Additionally, the filtered voltage is delivered to a non-inverting terminal of a second discharging comparator 525 and is compared to a lower threshold set by potentiometer 530. The output of the first and second comparators 515,525 are delivered to a discharge latching circuit 535. The discharge latching circuit 535 is similar in construction to the charge latching circuit 240 and will not be further discussed.

The current sense transformer 206 detects the current passing through the low voltage clamping circuit 180 and responsively produces a current sensing signal. A sensing resistor 540 receives the current sensing signal. The voltage across the sensing resistor 540 is delivered to a non-inverting input of a third discharging comparator 545 and is compared to a predetermined voltage value that represents a lower desired voltage of a discharged piezoelectric actuator. The predetermined voltage value is set via potentiometer 550. The output of the third comparator 545 is delivered to the discharge latching circuit 535.

The waveforms associated with the discharge latching circuit 535 are shown with reference to FIG. 6.

The output of the discharging latching circuit 535 represents the discharging control signal. The discharging control signal is delivered to a gate drive 555, which controls the state of the discharging transistor 165. For example, a logic high value of the discharging control signal (denoted by point M) causes the gate drive 555 to bias "ON" the discharging transistor 165. A logic low value of the discharging control signal causes the gate drive 555 to bias "OFF" the discharging transistor 165. Such gate drive circuits are well know in the art. For example, the gate drive circuit 555 is similar to that provided by Teledyne as model no. TSC427.

Advantageously, the present invention is adapted to control a plurality of piezoelectric actuators 110. Each piezoelectric actuator 110 includes a respective charging and discharging thyristor 150,195. For example, shown in FIG. 7 is an actuator selecting circuit 700. The charge command signal is delivered to pulse generators 705,710. The pulse generator 705 delivers a pulse to a plurality of AND gates 715 in response to receiving the charging command signal. The pulse generator 710 delivers a pulse to a plurality of AND gates 720 in response to receiving the discharging command signal. The AND gates 715,720 additionally receive a select signal, which indicates the predetermined piezoelectric actuator 110 that is to be charged/discharged. The output of each of the AND gates 715,720 is delivered to an associated Darlington transistor, which is part of a Darlington array 725,730. Accordingly, the output of each Darlington transistor is delivered to an associated pulse gate drive 735,740 to bias ON one of the charging or discharging thyristors 150,195. Thus, the command and select signals control the charging and discharging of the piezoelectric actuators 110.

INDUSTRIAL APPLICABILITY

The overall operation of the present invention will now be discussed in relation to the Figures. For this discussion, the reader may assume that the command signal is being supplied by an external engine control device that is responsive to a variety of engine operating parameters.

The charging circuit 115 is activated in response to the charging control signal. Accordingly the charging transistor 120 and thyristor 150 are biased ON to connect the piezoelectric actuator 110 to the energy source 105. Current then begins to flow through the charging inductor 125 to charge the piezoelectric actuator 110.

The current sensing transformer 201 measures the charging current. The charging current continues to increase until the current reaches a predetermined upper magnitude. Responsively, the charging transistor 120 is biased OFF to disconnect the piezoelectric actuator 110 from the energy source 105. Consequently, the charging inductor 125 forces the charging diode ON, which causes the charging current to decay. The charging current is now measured by the current sensing transformer 202. Once the magnitude of the charging current drops to the predetermined lower magnitude, the charging transistor 120 is once again biased ON.

The charging current continues to oscillate until the voltage across the piezoelectric actuator 210 is fully charged (as shown in FIG. 3). Once the piezoelectric actuator 110 is charged to an upper predetermined voltage value, the clamping diode 140 is biased ON. The current sensing transformer 203 then monitors the current through the high voltage clamping circuit 135. Once the current through the clamping diode reaches a predetermined magnitude, the charging is considered complete and the charging transistor 120 is biased OFF. As the charging current falls to zero, the charging thyristor 150 is biased OFF to disconnect the piezoelectric actuator 110 from the charging circuit 115.

The discharging circuit 155 is activated in response to the discharging control signal and operates in a similar manner to the charging circuit 115. The discharging transistor 165 and thyristor 195 are biased ON to connect the piezoelectric actuator 110 to ground. Current then begins to flow through the discharging inductor 170 to discharge the piezoelectric actuator 110. Note that the discharging current is opposited in orientation with respect to the charging current, but is discussed with reference to magnitude only.

The current sensing transformer 204 measures the current flowing to ground. The discharging current continues to increase until the current reaches a predetermined upper magnitude. Responsively, the discharging transistor 165 is biased OFF to disconnect the piezoelectric actuator 110 from the ground. In response to the discharging transistor 165 being biased OFF, the discharging diode 175 is biased ON by the discharging current. The discharging current then flows through the discharging diode 175 to the energy source 105. The discharging current exponentially decays until the discharging current drops to the predetermined lower magnitude, then the discharging transistor 165 is again biased ON. The current flowing through the discharging diode 175 is measured by the current sensing transformer 205.

The discharging current continues to oscillate until the voltage across the piezoelectric actuator 210 is fully discharged (as shown in FIG. 6). Once this occurs, the clamping diode 185 is biased on. The current sensing transformer 206 monitors the current through the low voltage clamping circuit 180. Once the current through the clamping diode reaches a predetermined magnitude, the discharging is considered complete and the discharging transistor 165 is biased OFF. As the discharging current falls to zero, the charging thyristor 150 is biased OFF to disconnect the piezoelectric actuator 110 from the discharging circuit 155.

As shown, the present invention provides a piezoelectric actuator circuit of simple and rugged design. The present invention is capable of functioning with multiple piezoelectric actuators to provide charging of one actuator, while simultaneously discharging another.

Other aspects, objects and advantages of the present invention can be obtained from a study of the drawings, the disclosure and the appended claims.

We claim:

1. An apparatus for driving a piezoelectric actuator in response to charging and discharging command signals, comprising:
   an energy source for supplying electrical energy to the piezoelectric actuator;
   a charging circuit, including:
      a charging transistor connected to the energy source and adapted to control the amount energy supplied to the piezoelectric actuator; and
      a charging inductor connected to the charging transistor and adapted to limit the rate of change of energy supplied to the piezoelectric actuator;
   a charging thyristor disposed between the charging circuit and the piezoelectric actuator;
   means for receiving the charging command signal and responsively biasing the charging thyristor ON to connect the piezoelectric actuator to the charging circuit;
   means for determining the magnitude of voltage applied to the piezoelectric actuator;
   means for receiving the charging command signal, and responsively biasing the charging transistor alternately ON and OFF to control the amount of energy supplied to the piezoelectric actuator in response to the piezoelectric actuator voltage being less than an upper desired voltage value; and
   means for biasing the charging thyristor OFF to disconnect the piezoelectric actuator from the charging circuit in response to the piezoelectric actuator voltage being greater than or equal to the upper desired voltage value.

2. An apparatus, as set forth in claim 1, including means for sensing the current charging the piezoelectric actuator, and biasing the charging transistor ON in response to the charging current being less than or equal to a predetermined lower magnitude, and biasing the charging transistor OFF in response to the charging current being greater than or equal to a predetermined upper magnitude.

3. An apparatus, as set forth in claim 2, including a charging diode being connected between the charging transistor and ground, the charging diode being biased ON in response to the charging transistor being biased OFF, and being biased OFF in response to the charging transistor being biased ON.

4. An apparatus, as set forth in claim 3, including a high voltage clamping circuit connected between the charging inductor and charging thyristor, and adapted to clamp the energy applied to the piezoelectric actuator to a predetermined charging voltage level.

5. An apparatus, as set forth in claim 4, including:
   a first charging current sensing transformer for sensing the current flowing through charging transistor and responsively producing a first charging current signal; and
   a second charging current sensing transformer for sensing the current flowing through the charging diode and responsively producing a second charging current signal.

6. An apparatus, as set forth in claim 5, including means for receiving the first and second charging current signals, superimposing the signals, and comparing the superimposed signal to the predetermined magnitudes.

7. An apparatus, as set forth in claim 6, including a third charging current sensing transformer for sensing the current flowing through the high voltage clamping circuit and responsively producing a third charging current signal.

8. An apparatus, as set forth in claim 7, including means for receiving the third charging current signal and comparing the signal to a predetermined value, the predetermined value being indicative of the predetermined maximum voltage value.

9. An apparatus, as set forth in claim 1, including a discharging circuit, including:
   a discharging transistor connected to the energy source and adapted to control the amount energy discharged from the piezoelectric actuator; and
   a discharging inductor connected to the discharging transistor and adapted to limit the rate of energy discharged from the piezoelectric actuator;
   a discharging thyristor disposed between the discharging circuit and the piezoelectric actuator, the discharging thyristor receiving a discharging signal and responsively turning ON to connect the piezoelectric actuator to discharging circuit;
   means for receiving the discharging command signal and responsively biasing the discharging thyristor ON to connect the piezoelectric actuator to the energy source;
   means for determining the magnitude of voltage released from the piezoelectric actuator;
   means for receiving the discharging command signal, and responsively biasing the discharging transistor alternately ON and OFF to control the amount of energy supplied to the piezoelectric actuator in response to the piezoelectric actuator voltage being less than a lower desired voltage value; and
   means for biasing the discharging thyristor OFF to disconnect the piezoelectric actuator from the discharging circuit in response to the piezoelectric actuator voltage being less than or equal to the lower desired voltage value.

10. An apparatus, as set forth in claim 9, including means for biasing the discharging transistor ON in response to the discharging current being less than or equal to a predetermined lower magnitude, and biasing the discharging transistor OFF in response to the discharging current being greater than or equal to a predetermined upper magnitude.

11. An apparatus, as set forth in claim 10, including a discharging diode being connected between the discharging transistor and the energy source, wherein the piezoelectric actuator discharges energy to the energy source in response to the discharging diode being biased ON, and discharges energy to ground in response to the discharging diode being biased OFF.

12. An apparatus for driving a piezoelectric actuator, comprising:
   an energy source being connected to the piezoelectric actuator;
   a charging circuit, including:

a charging transistor having a gate, source and drain, the drain being connected to the energy source and the source being connected to ground; and a charging inductor connected between the charging transistor source and the piezoelectric actuator;

a charging thyristor having an anode and a cathode, the anode being connected to the charging inductor and the cathode being connected to the piezoelectric actuator;

a discharging circuit, including:

a discharging transistor having a gate, source and drain, the drain being connected to the energy source and the source being connected to ground; and a discharging inductor connected between the discharging transistor drain and the piezoelectric actuator; and a discharging thyristor having an anode and a cathode, the anode being connected to the piezoelectric actuator and the cathode being connected to the charging inductor.

13. An apparatus, as set forth in claim 12, including a charging diode having an anode and a cathode, the anode being connected to ground and the cathode being connected to the charging transistor source.

14. An apparatus, as set forth in claim 13, including a high voltage clamping diode having an anode and a cathode, the anode being connected between the charging inductor and the charging thyristor anode, and the cathode being connected to the energy source.

15. An apparatus, as set forth in claim 14, including a discharging diode having an anode and a cathode, the anode being connected to the discharging transistor drain and the cathode being connected to the energy source.

16. An apparatus, as set forth in claim 15, including a low voltage clamping diode having an anode and a cathode, the anode being connected to ground, and the cathode being connected between the discharging inductor and the discharging thyristor cathode.

17. An apparatus, as set forth in claim 16, including a plurality of piezoelectric actuators, each piezoelectric actuator having a respective charging and discharging thyristor.

18. An apparatus, as set forth in claim 17, wherein the charging circuit is adapted to charge a first piezoelectric actuator simultaneous to the discharging circuit discharging a second piezoelectric actuator.

* * * * *